US010487964B2

(12) United States Patent
Stroike et al.

(10) Patent No.: US 10,487,964 B2
(45) Date of Patent: Nov. 26, 2019

(54) LINE LEADTHROUGH WITH INTEGRATED SMOKE STOPPER

(71) Applicant: HILTI AKTIENGESELLSCHAFT, Schaan (LI)

(72) Inventors: Chad Stroike, Tulsa, OK (US); Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 90 days.

(21) Appl. No.: 15/758,412

(22) PCT Filed: Sep. 2, 2016

(86) PCT No.: PCT/EP2016/070679
§ 371 (c)(1),
(2) Date: Mar. 8, 2018

(87) PCT Pub. No.: WO2017/042091
PCT Pub. Date: Mar. 16, 2017

(65) Prior Publication Data
US 2018/0266589 A1   Sep. 20, 2018

(30) Foreign Application Priority Data

Sep. 10, 2015   (EP) ..................................... 15184600

(51) Int. Cl.
*F16L 5/04*   (2006.01)
*H02G 3/04*   (2006.01)
*H02G 3/22*   (2006.01)
*H02G 15/013*   (2006.01)

(52) U.S. Cl.
CPC .............. *F16L 5/04* (2013.01); *H02G 3/0412* (2013.01); *H02G 3/0468* (2013.01); *H02G 3/22* (2013.01); *H02G 15/013* (2013.01)

(58) Field of Classification Search
CPC ... F16L 5/04; A62C 3/16; A62C 2/065; E04B 1/94; H02G 3/0412; H02G 3/22
USPC ...... 138/106, 103; 52/232; 220.8; 169/48, 54
See application file for complete search history.

(56) References Cited

U.S. PATENT DOCUMENTS

| | | | | |
|---|---|---|---|---|
| 5,155,957 A | * | 10/1992 | Robertson | .............. A62C 2/065 137/360 |
| 6,176,052 B1 | | 1/2001 | Takahashi | |
| 6,336,297 B1 | * | 1/2002 | Cornwall | .................. F16L 5/04 277/615 |
| 7,080,486 B2 | * | 7/2006 | Radke | .................. E04G 15/061 285/3 |

(Continued)

FOREIGN PATENT DOCUMENTS

EP   1 847 747 A2   10/2007
EP   2 572 760 A2   9/2012

(Continued)

*Primary Examiner* — Patrick F Brinson
(74) *Attorney, Agent, or Firm* — Grüneberg and Myers PLLC

(57) ABSTRACT

A line penetration is useful for routing lines through a building part. The line penetration includes: a jacket tube, a base part, which is disposed at a first axial end of the jacket tube and has a receiving space, surrounding a routing opening, for a firestop material, an annular, membrane-like sealing element, which is disposed at the first axial end of the jacket tube, and at least one sealing plug, which is disposed at a second end of the jacket tube.

13 Claims, 3 Drawing Sheets

(56) References Cited

U.S. PATENT DOCUMENTS

| | | | | |
|---|---|---|---|---|
| 7,465,888 B2 * | 12/2008 | Fischer | ................ | E04G 15/061 |
| | | | | 174/135 |
| 7,877,941 B2 * | 2/2011 | Fischer | ................ | E04G 15/061 |
| | | | | 174/64 |
| 8,188,382 B2 * | 5/2012 | Monden | ................ | E04G 15/061 |
| | | | | 174/505 |
| 9,140,387 B2 * | 9/2015 | Foerg | ..................... | A62C 2/065 |
| 10,143,868 B2 * | 12/2018 | Lopes | ..................... | H02G 3/22 |
| 10,145,494 B2 * | 12/2018 | Vandertook | ............ | F16L 5/025 |
| 2004/0016190 A1 | 1/2004 | Radke et al. | | |
| 2017/0030490 A1 * | 2/2017 | Vandertook | ............ | F16J 15/065 |

FOREIGN PATENT DOCUMENTS

| | | |
|---|---|---|
| WO | WO 2010/067637 A1 | 6/2010 |
| WO | WO 2012/088565 A1 | 7/2012 |

* cited by examiner

LINE LEADTHROUGH WITH INTEGRATED SMOKE STOPPER

The invention relates to a line penetration for routing lines such as pipes, cables or cable ducts through building parts, such as through ceilings or walls. In particular, the invention relates to an improved line penetration with integrated smoke stop.

Line penetrations are known in principle from the prior art. Known line penetrations are built into a building part, such as a wall or ceiling, while it is being constructed. In particular, the line penetrations may be cast in place in concrete ceilings or concrete walls. Preferably, such line penetrations are equipped with a fire-protection function. Thus fire protection already exists from the time that the line penetration is built into or cast in place in the building part, through installation of the line inside it until completion of the building. What is important for such line penetrations is their internal imperviousness to smoke gas.

Line penetrations known from the prior art are subsequently equipped with smoke-stopping abilities, such as introduction of mineral wool into the annular gap or sealing with sealing compound or grouting compound.

From US 2004/0016190 A1, a device through which lines can be routed is known that has a jacket tube and a base part that can be joined to the jacket tube. The base part has a receiving space, surrounding a routing opening, for a firestop material. The firestop material is an intumescent compound, which expands under fire conditions and seals the routing opening. An annular, membrane-like seal of an elastomeric material, which has an opening smaller than the routing opening of the jacket tube, is disposed between the firestop material and a shoulder.

A disadvantage of this device is that, especially in the case of installation in a wall or ceiling over the existing seal, it is not possible to establish absolute internal imperviousness of the line being routed through it. Thus smoke is able to pass the line penetration along the seal between line penetration and line being routed through it.

Furthermore, typical line penetrations may have a jacket tube in which precut foam slabs, which envelop a line, such as a pipe, a cable, a cable bundle or a cable duct and simultaneously try to seal it, are subsequently installed as smoke stops. These line penetrations with a cylindrical jacket tube may be used both in areas with fire-protection requirements and in areas in which requirements are imposed only on sound insulation, imperviousness to smoke gas or exclusion of draft air.

A disadvantage of this subsequent sealing with molded foam parts is that, when a new cable or line must be laid, it must be removed from the jacket tube and readapted. It has been recognized that simple insertion of a new cable or line is not possible, since the molded foam slabs or molded foam parts of the prior art are then pushed out of the cylindrical jacket tube or destroyed.

The object underlying the present invention is therefore to provide a line penetration for routing lines through building parts that offers improved imperviousness to smoke gas when in the installed condition and with line routed through it. In particular, it is an object of the present invention to provide a line penetration for routing lines through building parts that comprises a smoke stop, which is largely able to seal all branch points and does not have to be removed and readapted if the line assembly is modified.

According to the invention, the object is achieved in that a cylindrically shaped sealing plug is disposed at a second end of the jacket tube, whereby almost absolute imperviousness is assured when a line is routed through the line penetration. A further advantage of this sealing plug, especially in the case of ceiling penetrations, is that the rim gap between the jacket tube and the pipe routed through it is sealed at the top. Consequently, the rim gap is sealed simply and durably against smoke gas. Furthermore, this sealing plug ensures that lines thrust in from below are fed automatically to one of the guide grooves and can be routed easily through the center of the sealing plug. For lines that are to be routed from above, entry slits are visible and facilitate routing.

It is further advantageous when the sealing plug is disposed in a stiff annular member, which can be attached to the second end of the jacket tube. Accordingly, the sealing plug and the annular member form a module, which can be attached to the jacket tube if necessary, whereby flexible adaptation of the line penetration to the required imperviousness is possible. Alternatively, integration of the sealing plug directly into the jacket tube is also possible.

It is also favorable when the stiff annular member can be fixed in its position at the second end of the jacket tube via an annular fixation part that can be joined to the jacket tube. This annular fixation part may also be a covering element, via which the line penetration can be sealed as long as no line is being routed through it. Preferably, the jacket tube has a male thread, which can be screwed together with a second female thread of the annular fixation part, in order to fix this on the jacket tube. In this way, it is easy to mount the module together with the annular member and the sealing plug on the jacket tube.

Advantageously, the stiff annular member is made from a hard plastic, whereby easy mounting is ensured. Furthermore, a joint impervious to smoke gas can also be ensured between jacket tube and the stiff annular member by the material combination of plastic jacket tube and plastic annular member. Furthermore, a hard plastic has advantages in terms of production engineering, such as efficient manufacturability with mechanical stability, and also offers, for the anticipated useful life of the line penetration, safe functioning without any risk of corrosion and thus impairment of the fire-protection function.

Optimum sealing properties are achieved with a sealing plug that can be made to conform in seamless sealing manner to the surface of the line while the line is being routed through the line penetration.

In particular, optimum sealing properties are achieved with a sealing plug that is cylindrically shaped and has a first end face through which a line may be routed, wherein the first end face has a star-shaped division, wherein the circle sectors defined by the star-shaped division add up to a full circle with a circle center, and wherein the sealing plug has a second end face, which is faced away and spaced apart from the first end face, wherein the star-shaped division, starting from the circle center, flares along an axis of rotation of the sealing plug and in the direction of the second end face in such a way that the second end face is preferably formed in the shape of a circular ring and a conical cavity, along the shell surface of which at least one guide groove is formed, is established inside the sealing plug.

Thereby a line, such as a pipe, a cable, a cable bundle or a cable duct, can be introduced particularly easily into the sealing plug, wherein the flaring of the star-shaped division that results in the conical cavity with at least one guide groove greatly facilitates introduction of the line. Such a sealing plug forms the basis of a line penetration with a cylindrical jacket tube, in which the sealing plug no longer has to be removed, for example in case of change of the line assembly.

In a particularly preferred configuration, the sealing plug, starting from the first end face, is formed as a full cylinder along the axis of rotation for at least ¼ and/or at most ¾ of its total length. In other words, the sealing plug is preferably formed only in a front part by circle sectors or cylinder sectors, which add up to a full circle or to a full cylinder.

It has proved advantageous when at least six circle segments are formed at the first end face. Advantageously, at least six circular arc portions, which respectively add up to a circular ring, are provided in the area of the sealing plug in which the conical cavity is formed. Preferably, the number of guide grooves corresponds to the number of circle sectors. The guide grooves may be formed in such a way that they flare in the direction of the second end face. Alternatively, one width of the guide grooves may be constant in the direction of the second end face.

To facilitate thrusting of lines into the sealing plug, the cut faces and/or guide grooves defined by the star-shaped division may have one or more sliding layers. As an example, this sliding layer may be provided in the form of a film, which preferably covers the defined cut faces and/or guide grooves. Alternatively or additionally, the sliding layer may be provided in the form of a coated glass-fiber fabric, a cardboard sheet or a paper sheet, or else of a suitable geometric surface finish.

It has proved advantageous when the sealing plug is a polyurethane-RIM part. Preferably, the sealing plug consists of foam, more preferably of a relatively soft PUR foam. Alternatively to being provided as a RIM part, the sealing plug may also be cut and/or milled.

Furthermore, it has proved advantageous when the sealing plug contains at least one or more fire-protection additives.

In a particularly preferred improvement, the sealing plug has a longitudinal slit, preferably exactly one longitudinal slit, which extends continuously parallel to the axis of rotation from the first end face to the second end face, so that the sealing plug may be stretched out as a ribbed profile or the sealing plug may be formed by making the ribbed profile curl up. Such a ribbed profile offers the basis for a simplified manufacturing process, which will be described hereinafter with reference to the inventive manufacturing process.

As regards the line penetration, the object is achieved by a line penetration having a cylindrical jacket tube and at least one sealing plug described in the foregoing. According to the invention, the sealing plug is disposed in the jacket tube in such a way that the first end face of the sealing plug faces the membrane-like sealing element.

This has the advantage that a line introduced from the bottom through the star-shaped division flaring according to the invention with formed guide groove may be routed without snagging and centrally through the sealing plug. For lines that are to be routed from above, entry slits are visible and facilitate routing. In this regard, the invention includes the knowledge that sealing plugs, especially such of foam, disposed in cylindrical jacket tubes, are in principle a simple and inexpensive solution.

The module may be manufactured favorably from annular members and sealing plug described in the foregoing, if the sealing plug is fixed by substance-to-substance junction inside the stiff annular member. Accordingly, the sealing plug may be joined together with the annular member as a unit, for example by simply thrusting it in, inserting it or adhesively bonding it.

Further advantages and options of the invention will become obvious from the dependent claims, the description hereinafter and the figures. In the figures, the invention is illustrated in an exemplary embodiment. The figures, the description and the claims contain numerous features in combination. The person skilled in the art will also consider the features expediently, both individually and as practical further combinations.

Figure 1:
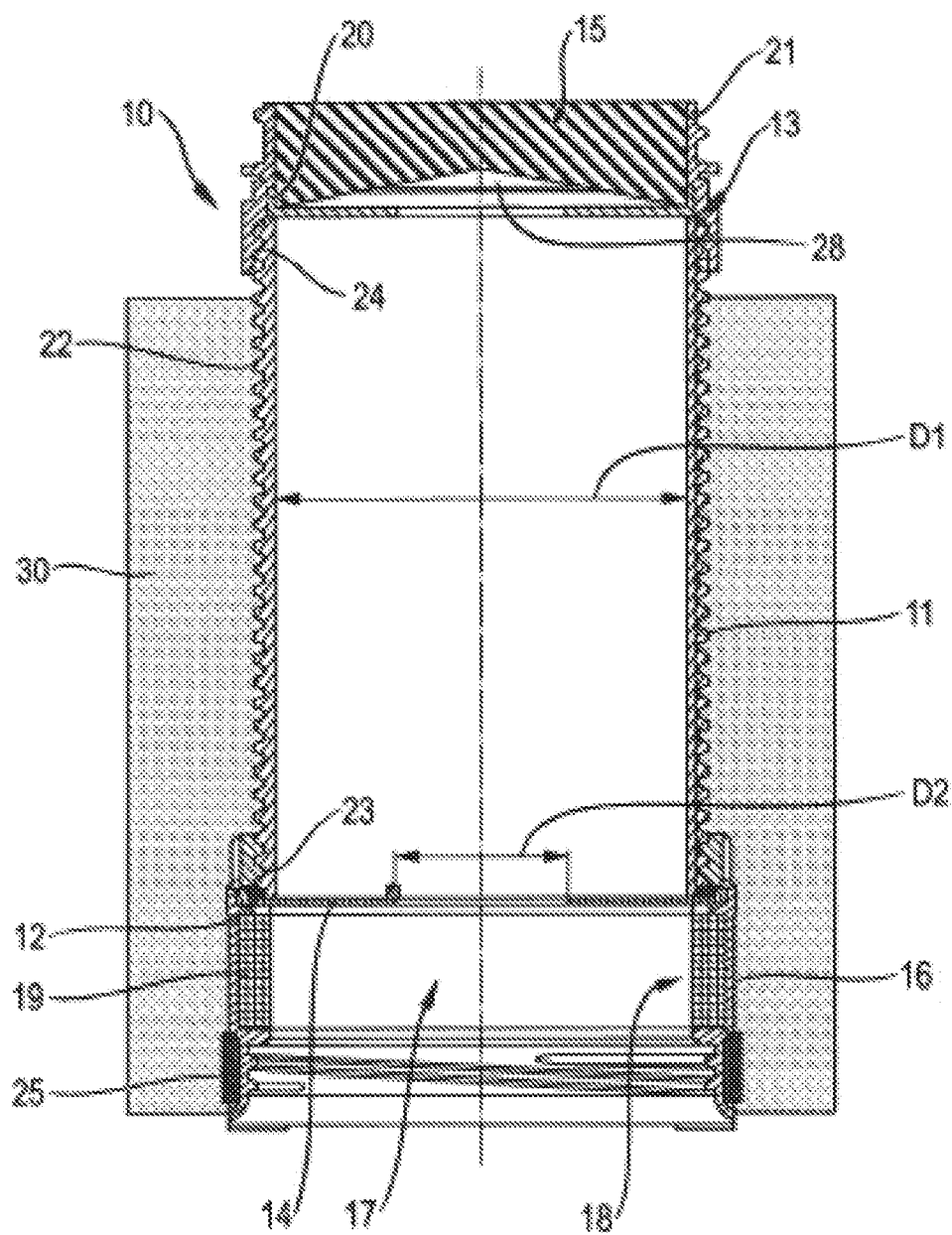
FIG. 1 shows a line penetration with a jacket tube in a wall, in longitudinal section.

A line penetration 10, shown in FIG. 1 and disposed in a building part 30, such as a concrete wall, comprises a jacket tube 11 with a male thread 22, which extends over the entire length extent of jacket tube 11. Furthermore, line penetration 11 comprises a base part 16, which has a receiving space 18, surrounding a routing opening 17, for a firestop material 19. Firestop material 19 is, for example, a ring of intumescent material, and it ensures fire protection of line penetration 10. Sealing of the outside relative to surrounding building part 30 is achieved by a sealing ring 25, which is disposed on the outside of base part 16.

Line penetration 10 is formed in FIG. 1 as a case-in-place part which, prior to construction of a building part 30 in the form of a concrete wall, can be fixed on formwork, not illustrated in the figures, and is embedded in building part 30 when the concrete is poured into the formwork. For this purpose, a flange, not visible in the figures, is present on base part 16, with fastening apertures at which base part 16 can be fixed to the formwork by nails or the like.

Base part 16 has a first female thread 23, via which base part 16 is screwed onto a first end 12 of jacket tube 11 with its male thread 22. An annular, membrane-like sealing element 14 of rubbery elastic material, which has an inside diameter D2 smaller than inside diameter D1 of jacket tube 11, is disposed between base part 16 and jacket tube 11. This membrane-like sealing element 14 defines a first sealing level of line penetration 10.

A cylindrically shaped sealing plug 15 of a foam-like material is disposed at a second axial end 13 of jacket tube 11, and it defines a second sealing level of line penetration 10, i.e. a smoke stop. Cylindrically shaped sealing plug 15 is disposed in a stiff annular member 20 of hard plastic, with which it is joined as a module by substance-to-substance junction, e.g. by thrusting it in, inserting it or adhesively bonding it. Via an annular fixation part 21, which may likewise be formed as a closure cap or cover part and which has a second female thread 24, which is screwed together with male thread 22 of jacket tube 11, annular member 20 is fixed to jacket tube 11 as shown in FIG. 1.

Figure 2:
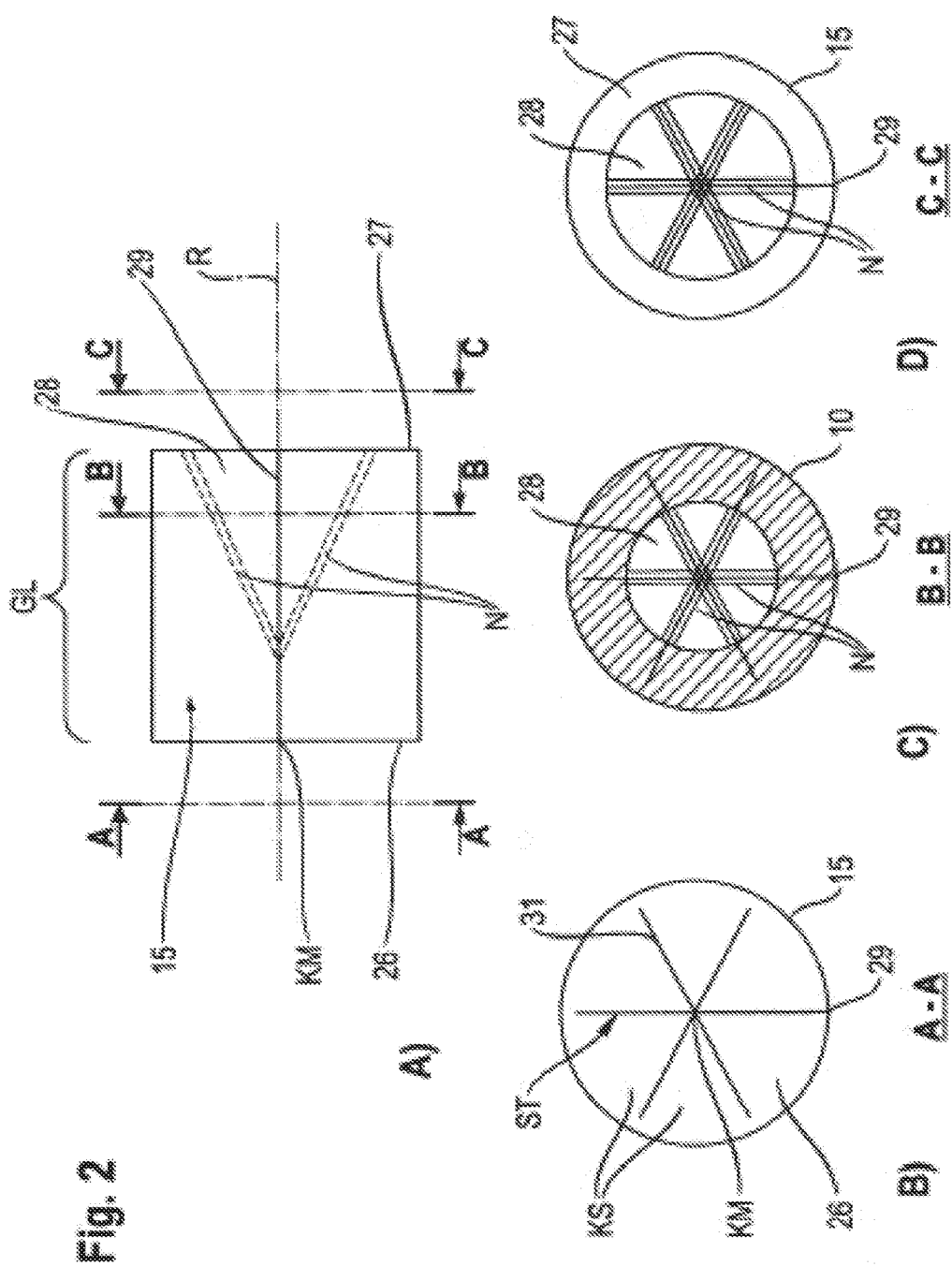
FIG. 2 shows a schematic diagram of an inventive sealing plug for the line penetration.

FIG. 2 shows an inventive sealing plug 15, wherein FIG. 2A shows sealing plug 15 with its total length GL in side view and the respective sections A-A, B-B and C-C are illustrated in FIG. 2B, C, D.

According to the invention, star-shaped division ST, starting from circle center KM, flares along axis of rotation R of sealing plug 15 and in the direction of second end face 27 (i.e. toward the right here). Thereby second end face 27 has circular ring shape. This may be inferred from FIG. 2D. A conical cavity 28 is established inside sealing plug 15 by the inventive flaring within the sealing plug. Six guide grooves N, which act as cable guides, are formed along the shell surface of conical cavity 28. One guide groove N is allocated to each of circle sectors KS.

Conical cavity 28 is represented by hatching in the side view in FIG. 2A, since it extends inside sealing plug 15. Accordingly, only two guide grooves are also illustrated in FIG. 2 A.

As may be inferred from FIG. 2B, sealing plug 15 is divided in star-shaped manner at first end face 26, in such a way that it forms six equally large circle sectors KS.

Sealing plug 15 has exactly one longitudinal slit 29. Longitudinal slit 29 extends continuously parallel to axis of rotation R from first end face 26 to second end face 27. This may be inferred both from the side view in FIG. 2A and also the respective views in FIGS. 2B, C and D.

Likewise it may be inferred from FIG. 2D that star-shaped division ST, which together with its circle center KM starts from first end face 26, does not extend completely to second end face 27. To the contrary, second end face 27 remains as a circular ring, which is slit only by longitudinal slit 29. Because of longitudinal slit 29, sealing plug 15 may be stretched out as a ribbed profile, or a ribbed profile, which is provided in the form of a polyurethane-RIM part, for example, may be curled up as sealing plug 15 of FIG. 2.

Figure 3:
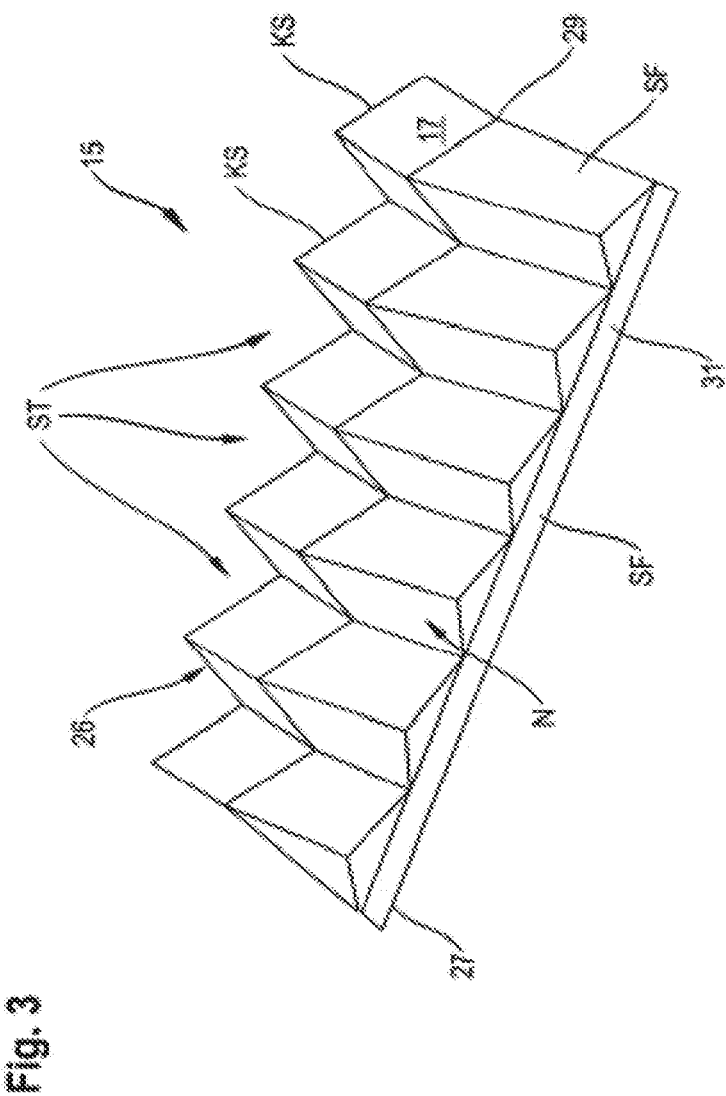
FIG. 3 shows an inventive sealing plug for the line penetration stretched out as a ribbed profile.

FIG. 3 shows an inventive sealing plug 15, which is stretched out as a ribbed profile. Sealing plug 15 in this case is a polyurethane-RIM part. Star-like division ST, which forms circle sectors KS, is illustrated correspondingly in stretched-out form in the upper part of FIG. 3. Second end face 27, which in the curled-up condition of the ribbed profile shown in FIG. 3 describes a circular ring, is visible in the lower part of FIG. 3. The inventive guide grooves N are formed by the lands of the ribs descending from first end face 26 to second end face 27 (toward the front in the direction of the figure).

In the exemplary embodiment illustrated here, cut faces SF defined by star-shaped division ST have a sliding layer 31, which is obtained by coating with a lubricant. Longitudinal slit 29 is illustrated on the right side of the ribbed profile, which is provided in the form of strip, and which in curled-up condition forms sealing plug 15.

During routing, through a line penetration 10, via routing opening 17 of line penetration 10, of a line, such as a pipe, cable, cable bundle or the like, not illustrated in the figures, membrane-like sealing element 14 and cylindrically shaped sealing plug 15 are widened and conform sealingly in the form of a film with the surface of the line. For this purpose, the line has a diameter which preferably corresponds substantially to the inside diameter D1 of jacket tube 11. Almost absolutely impervious routing of the line through line penetration 10 is achieved.

The invention claimed is:

1. A line penetration for routing a line through a building part, the line penetration comprising:
    a jacket tube,
    a base part, which is disposed at a first axial end of the jacket tube and has a receiving space, surrounding a routing opening, for a firestop material,
    an annular membrane sealing element which is disposed at the first axial end of the jacket tube, and
    at least one sealing plug, which is disposed at a second end of the jacket tube,
    wherein the sealing plug is cylindrically shaped and has a first end face through which a line may be routed,
    wherein the first end face has a star-shaped division,
    wherein circle sectors defined by the star-shaped division add up to a full circle with a circle center,
    wherein the sealing plug has a second end face, which is faced away and spaced apart from the first end face, and
    wherein the star-shaped division, starting from the circle center, flares along an axis of rotation of the sealing plug and in the direction of the second end face in such a way that the second end face is formed in the shape of a circular ring, and a conical cavity, along the shell surface of which at least one guide groove is formed, is established inside the sealing plug.

2. The line penetration according to claim 1, wherein the sealing plug, starting from the first end face, is formed as a full cylinder along the axis of rotation for at least ¼ and/or at most ¾ of its total length.

3. The line penetration according to claim 1, wherein at least six circle segments are formed at the first end face.

4. The line penetration according to claim 1, wherein a cut face and/or the guide defined by the star-shaped division have a sliding layer.

5. The line penetration according to claim 1, wherein the sealing plug is a polyurethane-RIM part.

6. The line penetration according to claim 1, wherein the sealing plug comprises at least one fire-protection additive.

7. The line penetration according to claim 1, wherein the sealing plug has a longitudinal slit, which extends continuously parallel to the axis of rotation from the first end face to the second end face, so that the sealing plug may be stretched out to a ribbed profile or the sealing plug may be formed by making the ribbed profile curl up.

8. The line penetration according to claim 1, wherein the firestop material in the receiving space is a ring of intumescent material.

9. The line penetration according to claim 1, wherein the at least one sealing plug is present in a stiff annular member, which can be attached to the other end of the jacket tube.

10. The line penetration according to claim 9, wherein the stiff annular member can be fixed in its position at the other end of the jacket tube via an annular fixation part that can be joined to the jacket tube.

11. The line penetration according to claim 9, the stiff annular member comprises a hard plastic.

12. The line penetration according to one claim 9, wherein the sealing plug is fixed by substance-to-substance junction inside the stiff annular member.

13. The line penetration according to claim 1, wherein the sealing plug has exactly one longitudinal slit.

* * * * *